United States Patent [19]
Cantarutti

[11] 4,128,450
[45] Dec. 5, 1978

[54] TIRE COMPONENT BUILDING DRUM
[75] Inventor: Armindo Cantarutti, Akron, Ohio
[73] Assignee: NRM Corporation, Akron, Ohio
[21] Appl. No.: 782,994
[22] Filed: Mar. 30, 1977
[51] Int. Cl.² .............................................. B29H 17/16
[52] U.S. Cl. .................................... 156/417; 156/126
[58] Field of Search .................. 156/123 R, 126–129, 156/133, 394 R, 414, 415, 417, 418, 419, 420; 242/72; 279/2

[56] References Cited
U.S. PATENT DOCUMENTS

| | | | |
|---|---|---|---|
| 3,151,013 | 9/1964 | Nebout | 156/126 |
| 3,160,545 | 12/1964 | Burton | 156/415 |
| 3,405,023 | 10/1968 | Eckenwiler et al. | 156/415 |
| 3,813,271 | 5/1974 | Riggs | 156/123 |
| 3,865,670 | 2/1975 | Habert | 156/128 R |
| 3,888,720 | 6/1975 | Habert | 156/133 |

FOREIGN PATENT DOCUMENTS 983349  2/1965  United Kingdom .................. 156/414

*Primary Examiner*—John E. Kittle
*Attorney, Agent, or Firm*—Maky, Renner, Otto & Boisselle

[57] ABSTRACT

A tire component building machine includes a rotatable hub with a plurality of circumferentially spaced circular segments each having the same radius of curvature and each including a stem mounted on the hub for radial movement. A stud passing through and removably secured to each stem includes a projecting portion engaging a spiral cam, one end of each stud being exposed on a common side of the stems whereby each stud may readily be removed and the segments replaced by another set of segments each having another same radius of curvature. A drive assembly mounted on the hub rotates the hub and cam relative to one another radially to expand and contract the segments. In addition, the maximum expansion of the drum may be precisely regulated by an adjustable stop. A gap shield is provided to present a continuously firm circular work surface.

4 Claims, 7 Drawing Figures

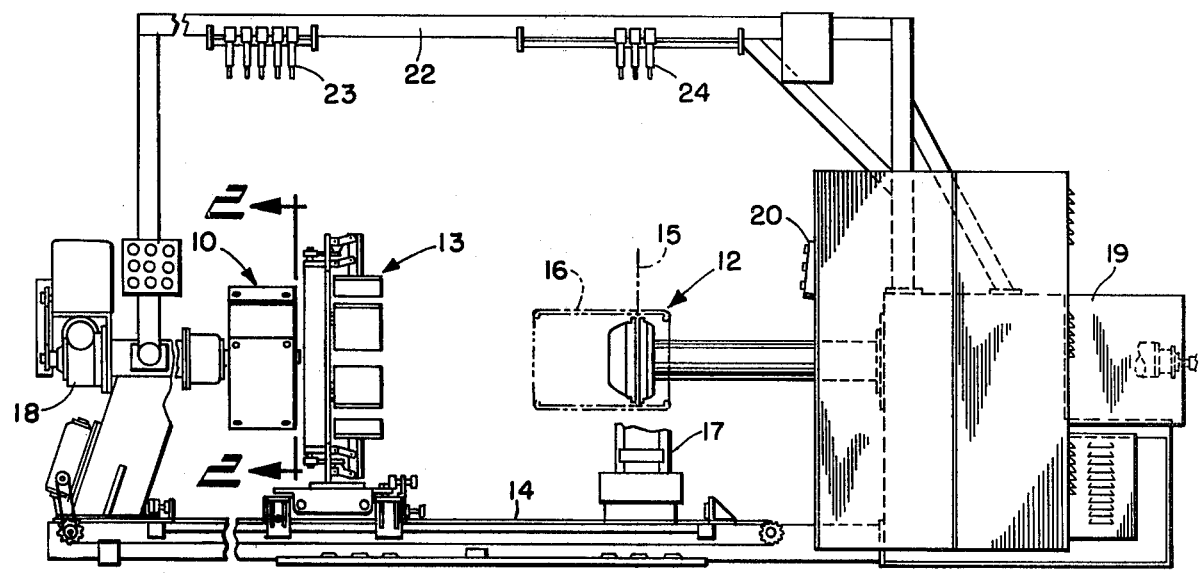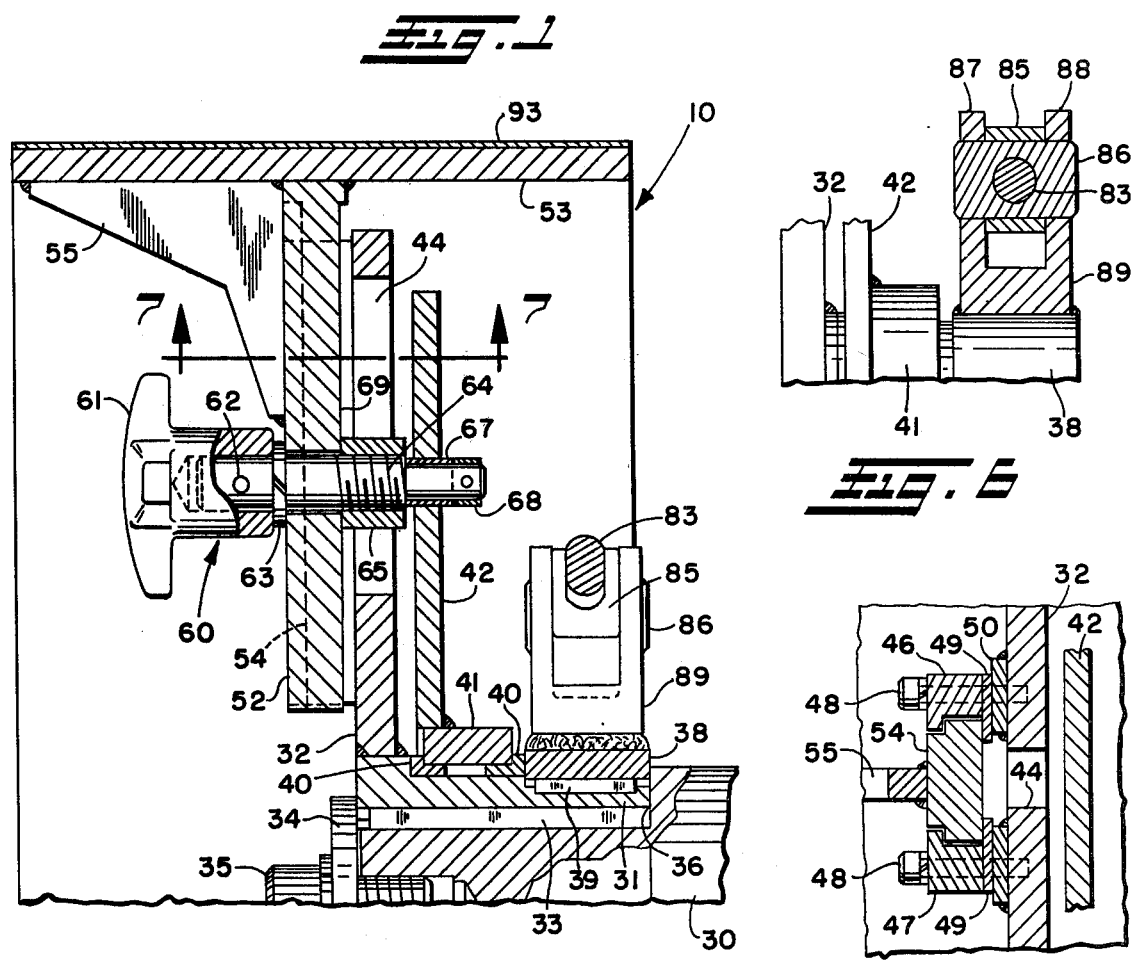

TIRE COMPONENT BUILDING DRUM

This invention relates generally as indicated to a tire component building drum and more particularly to a drum for producing a tire component such as a belt-tread assembly.

In the manufacture of belted tires and more particularly radial tires, there is required a belt or belt assembly, which may include the tread, such belt assembly being relatively inextensible in a circumferential direction. In the two-stage construction of radial tires, the belt and tread assembly is usually preassembled and then transferred to the shaped carcass to be secured thereto at a second stage machine. Such belt assemblies may include two or more belt plies which may be the same or of different widths with the tread secured to the exterior thereof.

It is particularly important that the belt-tread assembly be constructed to the required precise circumference within close tolerances. Not only must the diameter of the belt-tread assembly be precise, but the circular shape thereof should approach, as closely as possible, that of a perfect circle.

In the construction of belt-tread assemblies, the drum on which such assemblies are made is set to the desired diameter and the drum is then collapsed after the construction of the belt-tread assembly so that it can be removed or transferred to the second stage machine. To build belt-tread assemblies of different size, a different set diameter is required. The segments which form the drum each have a given or identical radius which in the middle position of the segments forms a perfect circle. However, significant variation from the optimum set of the drum will cause the segments to depart excessively from the perfect circle condition. Thus, to maintain the desired tolerance range from the circular form of the segments of the working surface, the segments should be replaced by another set of segments each having another common radius of curvature. Accordingly, the size variations obtainable by a given set of segments are limited by the precision required in the construction of the belt-tread assembly. It is, therefore, highly desirable to provide a drum for the construction of tire components such as belt-tread assemblies wherein the segments employed can readily be removed and replaced by another set.

Most tire component building drums are of such complexity that the segments cannot readily be replaced without substantial disassembly of the machine. Accordingly, it is desirable that a tire component building drum be provided wherein the segments can readily be replaced in a short period of time. It is also desirable that parts subject to wear be readily replaceable and that the diameter set stop be fully and accurately adjustable and not subject to wear. It is also important that the drum be of simplified construction having relatively few parts.

It is accordingly a principal object of the present invention to provide a simplified and improved tire component building drum.

Another principal object is the provision of a tire component building drum wherein one set of segments of one radius of curvature may readily be removed and replaced with another set of segments of another radius of curvature.

A further important object is the provision of such drum wherein the set of segments may be readily and easily removed by withdrawing a relatively accessible stud for each segment.

Another important object is the provision of such drum wherein the removable stud also incorporates the cam follower driving the segments for expansion and contraction.

Still another object is the provision of such drum wherein the stud also secures the segments for rotation by the hub of the drum while permitting radial expansion and contraction.

A still further object is the provision of such drum having a diameter set adjustment for precisely controlling the diameter to which the drum may expand.

A yet further object is the provision of such drum of highly simplified construction having relatively few parts.

These and other objects and advantages of the invention will become apparent as the following description proceeds.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

In said annexed drawings:

FIG. 1 is a front elevation partially broken away of a tire building machine in which the tire component building drum of the present invention may be utilized;

FIG. 3 is a somewhat enlarged radial quarter section of the drum taken substantially from the line 3—3 of FIG. 2;

FIG. 6 is a fragmentary sectional view taken substantially on the line 6—6 of FIG. 2 illustrating the swivel support for the diameter set stop assembly; and FIG. 7 is a fragmentary sectional view taken from the line 7—7 of FIG. 3 illustrating the stem of the sector and its guide mounting in the hub.

Figure 2:
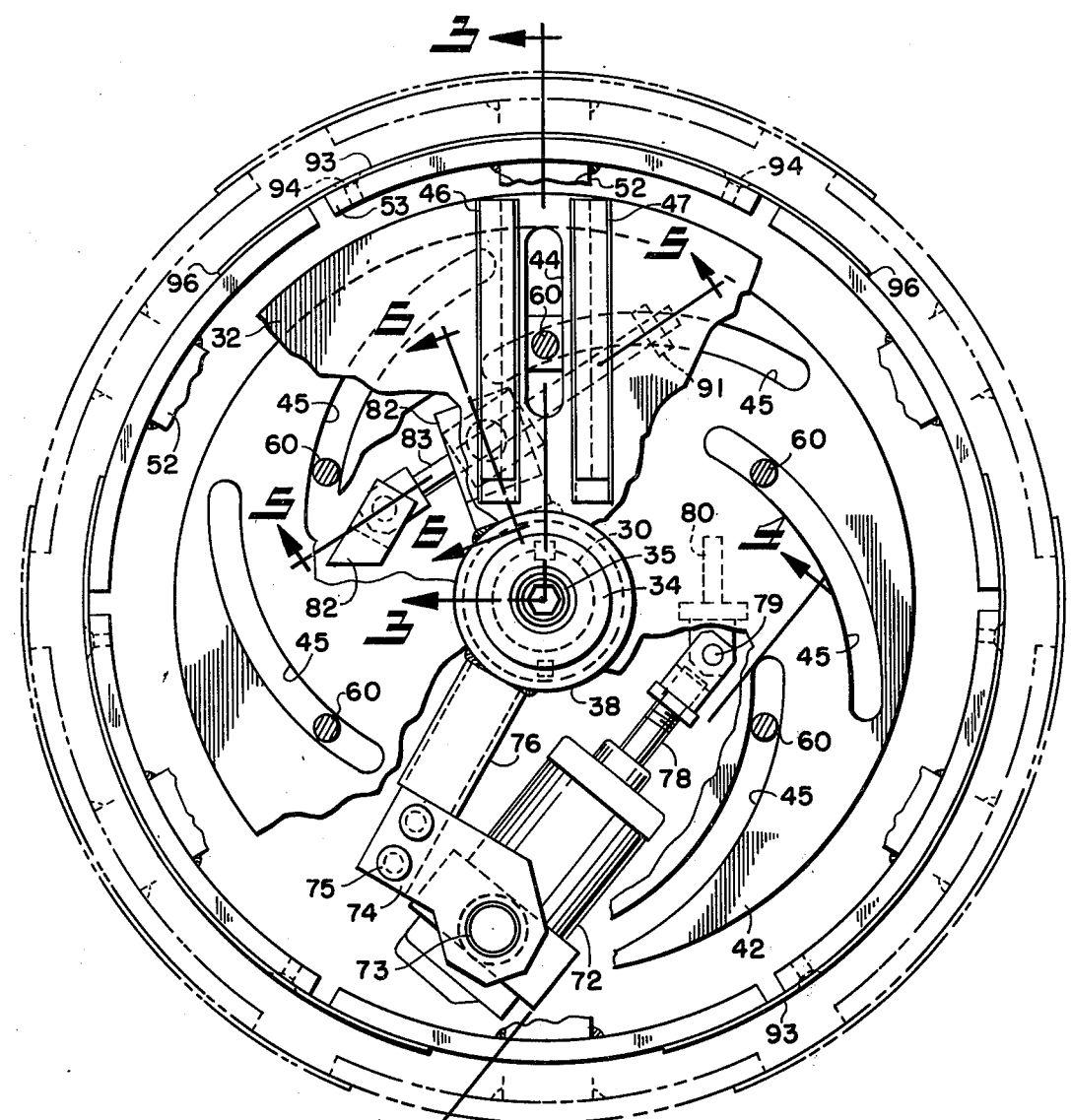
FIG. 2 is an enlarged fragmentary end elevation taken substantially from the line 2—2 of FIG. 1 with parts broken away for clarity of illustration.

Referring now to the annexed drawings and more particularly to FIG. 1, there is illustrated the components of a radial tire building system, one of such components, indicated at 10, being the tire component building drum of the present invention. The drum is in essence a circular rotatable work surface adapted to expand to a given or set diameter and then to collapse after the tire component such as a belt-tread assembly is built thereon.

In the system illustrated, there is also shown a second stage tire machine indicated generally at 12 and a transfer shown at 13 is mounted on suitable rails and driven by chain drive 14 for movement between the center line of the drum 10 and the center line of the second stage machine 12. The transfer is shown and described in applicant's copending application entitled "Tire Component Transfer", Ser. No. 782,990 filed even date herewith.

It is the function of the transfer 13 to grip and engage the belt-tread assembly after it is made on the drum 10 and the drum 10 collapsed, and then transfer the belt-tread assembly to the center line 15 of the second stage machine and then hold the belt-tread assembly in such position until the first stage carcass shown at 16 is shaped by the second stage machine into the belt-tread assembly. Then the transfer releases the belt-tread assembly and moves to the position shown to permit the belt-tread assembly to be stitched to the shaped carcass by a suitable stitching mechanism indicated at 17. While the belt-tread assembly is being stitched to the carcass, another belt-tread assembly is being made on the drum 10.

The drum 10 includes a drive assembly 18 for rotating the drum in precise increments. The second stage machine includes a main housing 19 which includes a main power unit for the flanges of the second stage drum. A control panel 20 is provided to the operator's right. The system may also include a guide light bracket 22 supporting guide light projectors as indicated at 23 and 24 to assist the operator in positioning various tire components on the drum 10 or on the carcass 16, respectively.

The construction and operation of the second stage machine 12 may be seen in the copending application of George E. Enders, entitled "Tire Building Machine", Ser. No. 814,196, filed July 11, 1977.

Referring now to FIGS. 2 and 3, it will be seen that the drum 10 is secured to and rotatable with drive shaft 30 projecting in cantilever fashion from the drive 18. The shaft includes a reduced diameter end portion to which is keyed the cylindrical hub 31 of drive plate 32, such key being shown at 33 in FIG. 3. A washer retainer 34 is secured by fastener 35 to the end of the shaft holding the hub 31 against the shoulder 36.

A ring 38 is secured to the hub 31 for rotation therewith by key 39. Journalled on the hub 31 by the two shoulder bushings illustrated at 40 is the hub portion 41 of cam plate 42. The cam plate 42 extends parallel to the drive plate 32, both being normal to the axis of the shaft 30.

As seen more clearly in FIG. 2, the drive plate 32 is provided with six equally circumferentially spaced radial slots 44 while the cam plate is provided with six equally circumferentially spaced spiral slots 45.

As seen more clearly perhaps in FIGS. 2 and 7, the side of the drive plate opposite the cam plate is provided with a pair of gibs indicated at 46 and 47 for each of the slots 44. Each gib is secured by a series of fasteners 48 passing through spacers 49 and mounting pads 50. The spacers and gibs may be brass or bronze.

In this manner, there is provided six radially extending guide ways for each of the stems 52 of the drum sectors 53. Like the radial and spiral slots, the sectors are six in number and equally circumferentially spaced. It will, however, be appreciated that more or fewer may be employed.

The outer lateral edge of each stem is provided with a shoulder 54 interfitting with the shoulders provided by the gibs. The stem is welded to the interior of the circular segment of the sector at the center thereof and a gusset 55 extends between the stem and the interior of the segment.

Referring now more particularly to FIG. 3, it will be seen that the stem of each segment is drivingly connected to the cam plate 42 by a stud assembly shown generally at 60. The stud projects through a hole in the stem 52, through the slot 44, and into the cam plate 42.

The outer or exposed end of the stud is provided with a hand knob 61 which may be held in place by a taper pin 62. A lock washer 63 is situated between the knob and the face of the stem 52.

The stud includes a threaded portion 64 having threaded engagement with rectangular nut 65. The end of the stud beyond the threaded portion is of reduced diameter providing a shoulder as indicated at 66. A self-lubricating bushings 67 is secured on such reduced diameter end portion of the stud by pinned bushing 68. The bushing 67 rides in one of the spiral slots 45 of the cam plate 42. The bushings 67 and 68 have an O.D. less than the I.D. of the threads of nut 65.

When the stud is tightened by the hand knob 61, the nut 65 will be clamped firmly against the backside 69 of the stem and yet the nut and stud will be freely movable in the radial slot 44. When tightened, the stud is thus firmly secured to the stem. The nut also serves to limit deflection of the stud. The stud in this manner provides a driving connection between the cam plate 42 on one side of the drive plate 32 and the stem of the sector on the opposite side. The hand knob 61 is exposed for easy access. It will be appreciated that in lieu of the hand knob indicated, the stud may be provided with a hex recess or head, for example, so that it may readily be loosened or tightened by an air wrench.

Figure 4:
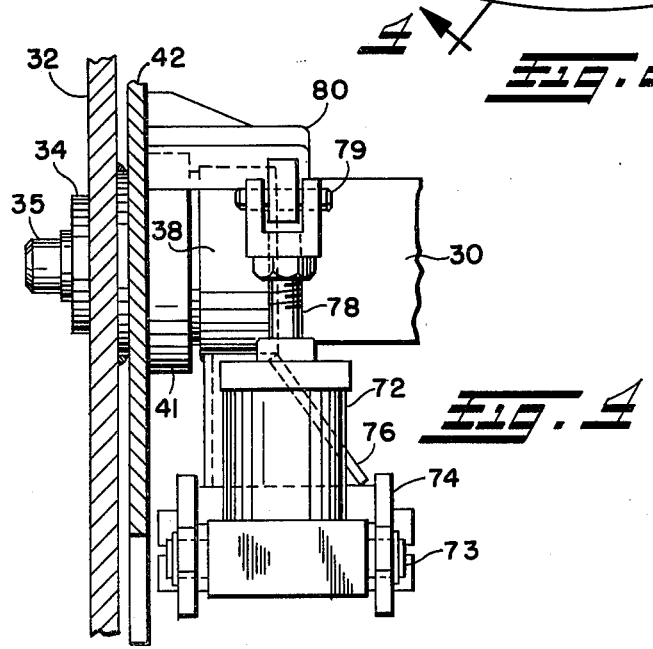
FIG. 4 is a fragmentary sectional view taken substantially from the line 4—4 of FIG. 2 illustrating the piston-cylinder assembly for expanding and contracting the drum.

Rotation of the cam plate 42 with respect to the drive plate 32 is obtained by piston-cylinder assembly 72 seen more clearly in FIGS. 2 and 4. The blind end of the piston-cylinder assembly is pivoted at 73 to bracket 74 secured by fasteners 75 to arm 76 projecting radially from ring 38. It will be recalled that the ring 38 is keyed to the hub 31 which is in turn keyed to the shaft 30.

The rod 78 of the piston-cylinder assembly is connected at 79 to bracket 80 secured to and projecting from the cam plate 42. Thus, extension of the piston-cylinder assembly as seen in FIG. 2 will cause the cam plate to rotate in a counterclockwise direction, and retraction will cause it to rotate in a clockwise direction.

Figure 5:
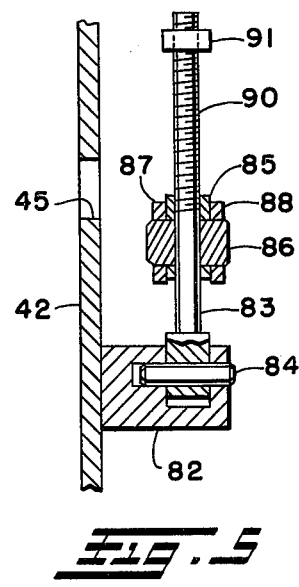
FIG. 5 is a fragmentary sectional view taken substantially along the line 5—5 of FIG. 2 illustrating the adjustable diameter set stop assembly.

Also secured to the cam plate 42 is a block 82 seen in FIGS. 2 and 5 to which is pivotally connected the head of stop rod 83 by pin 84. As seen more clearly in FIGS. 5 and 6, the stop rod also extends through a block 85 and a diametral hole in bronze swivel pin 86 which extends through the block 85 and is supported for swivel movement in the arms 87 and 88 of clevis block 89 secured to and projecting from the ring 38. The end of the stop rod opposite its pivotal connection 84 to the block 82 is threaded as indicated at 90 and an adjustable stop nut 91 is threaded thereon. As seen in FIG. 2, as the cam plate rotates in a counterclockwise direction, moving the sectors uniformly outwardly, the rod 83 will be drawn through the block 85 and the swivel bushing 86 until the nut 91 engages the face of the block 85, thus limiting the extension of the piston-cylinder assembly 72 and the expansion of the drum.

The nut may readily be adjusted along the stop rod to obtain the desired maximum set diameter of the drum.

As seen in FIG. 2, every other sector is provided with a sheet metal gap shield shown at 93 which may be secured to the exterior of the sector by recessed fasteners indicated at 94 at each edge thereof. The gap shields may be provided with a certain curvature set or springiness particularly at their outer ends as indicated at 95 and 96 so that the edges will remain in contact with the exterior surface of the adjacent sectors at all positions of the expansion or contraction of the drum.

The exterior curvature of the segments is designed to form a perfect circle at a median or midpoint of a certain relatively narrow diameter range. For example, the diameter range for any given set of segments may be on the order of 7.6 cm so that if the segments are required to move beyond a range of 3.8 cm on either side of the median, the segments should be replaced by another set. This can readily be accomplished by unscrewing and removing the exposed studs. When the stud is removed, the sectors will pull radially out of their guide ways in the drive plate. It can also be seen that the spiral cam following bushing 67, which might be subject to wear, can also quickly be replaced. The segments can be changed perhaps as quickly as an automobile wheel can be replaced.

It can now be seen that there is provided a simplified tire component building drum for the construction of tire belt or tire belt-tread assemblies wherein the sectors can readily be replaced for a different range of adjustment. The drum thus provided is also less complex, more inexpensive to build, and less subject to wear and maintenance than conventional tire building drums.

The embodiments of the invention in which an exclusive property or privilege is claimed are defined as follows:

1. A tire component building drum comprising a set of circular segments each having the same radius of curvature, each segment including a radially inwardly extending stem, support means mounting said stems for movement radially to expand and contract said segments, cam means rotatably mounted on said support means, and stud means connecting each said stem to said cam means on the same side of said stem, with said stud means projecting from the opposite side of each stem, whereby said stud means may readily be removed and said segments replaced by another set of segments each having another same radius of curvature.

2. A tire component building drum comprising a set of circular segments each having the same radius of curvature, each segment having a radially inwardly extending stem, said stem including an opening, support means mounting said stem for movement radially, cam means rotatably mounted on said support means, and follower means removably secured to said stem for engaging said cam means, said follower means extending through and from said opening in said stem, one end of said follower means being readily accessible whereby said follower means may be removed from said stem, said follower means having a knob at said one end, a threaded portion, and a nut threadably engaging said threaded portion for clamping said stem between said knob and nut.

3. The tire component building drum set forth in claim 2 wherein said support means includes a radially extending slot adjacent said stem, and said nut is disposed in said slot for radial movement therein.

4. The tire component building drum set forth in claim 3 wherein said knob is a hand knob for rotating said follower means to tighten and loosen said nut on said follower means.

* * * * *